(12) United States Patent
Tomita et al.

(10) Patent No.: US 11,955,785 B2
(45) Date of Patent: Apr. 9, 2024

(54) RESIN STRUCTURE

(71) Applicant: YAZAKI CORPORATION, Tokyo (JP)

(72) Inventors: Kei Tomita, Makinohara (JP); Kengo Ishida, Makinohara (JP); Yukihiro Koyama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 180 days.

(21) Appl. No.: 17/495,116

(22) Filed: Oct. 6, 2021

(65) Prior Publication Data

US 2022/0115851 A1 Apr. 14, 2022

(30) Foreign Application Priority Data

Oct. 12, 2020 (JP) .................................. 2020-172005

(51) Int. Cl.
*H02G 3/08* (2006.01)
*B60R 16/023* (2006.01)

(52) U.S. Cl.
CPC ......... *H02G 3/088* (2013.01); *B60R 16/0239* (2013.01); *H02G 3/081* (2013.01)

(58) Field of Classification Search
CPC ..... H02G 3/088; H02G 3/081; B60R 16/0239
USPC ........................................................ 220/3.8
See application file for complete search history.

(56) References Cited

U.S. PATENT DOCUMENTS

| 11,600,978 | B2 * | 3/2023 | Tomita | H02G 3/14 |
| 2009/0280661 | A1 | 11/2009 | Akahori | |
| 2013/0032371 | A1 | 2/2013 | Makino | |
| 2017/0207614 | A1 * | 7/2017 | Shiraki | H02G 3/088 |
| 2019/0348826 | A1 * | 11/2019 | Ikeda | B60R 16/0207 |
| 2020/0343703 | A1 * | 10/2020 | Nakashima | B60R 16/0238 |
| 2021/0083463 | A1 * | 3/2021 | Washihira | H02G 3/086 |
| 2021/0143622 | A1 * | 5/2021 | Sugiyama | B60R 16/0238 |
| 2021/0203144 | A1 * | 7/2021 | Akiba | H02G 3/16 |
| 2021/0320483 | A1 * | 10/2021 | Otsuba | H02G 3/088 |

FOREIGN PATENT DOCUMENTS

| JP | 3-130164 U | 12/1991 |
| JP | 2009-273311 A | 11/2009 |
| JP | 2013-34320 A | 2/2013 |

(Continued)

*Primary Examiner* — J. Gregory Pickett
*Assistant Examiner* — Niki M Eloshway
(74) *Attorney, Agent, or Firm* — Sughrue Mion, PLLC (57) ABSTRACT

A resin structure includes first and second resin bodies including first and second wall portions and first and second engagement portions, respectively. One of the first engagement portions engages with one of the second engagement portions and form a first engaging part. Another one of the first engagement portions engages with another one of the second engagement portions and form a second engaging part. The first engaging part is positioned on a further front side than the second engaging part in an attaching direction of the second resin body to the first resin body. When the second resin body is rotated toward the first resin body with the first engaging part as a center of rotation and with the one of the first engagement portions being engaged with the one of the second engagement portions, the first wall portion is prevented from interfering with the second wall portion.

4 Claims, 7 Drawing Sheets

(56) References Cited

FOREIGN PATENT DOCUMENTS

| JP | 2016-25803 A | | 2/2016 | |
|----|--------------|---|--------|---|
| JP | 2019-88105 A | | 6/2019 | |
| JP | 2021044995 A | * | 3/2021 | ......... B60R 16/0238 |

* cited by examiner

RESIN STRUCTURE

CROSS-REFERENCE TO RELATED APPLICATION

The present application claims priority to Japanese Patent Application No. 2020-172005 filed on Oct. 12, 2020, the entire content of which is incorporated herein by reference.

TECHNICAL FIELD

The present invention relates to a resin structure.

BACKGROUND

A related art resin structure is formed by attaching a plurality of resin bodies to each other, such as an electrical junction box (for example, a relay box) to be mounted on a vehicle. For example, one of electrical junction boxes of related art includes a main body case that holds electronic components and the like, and an upper cover (or a lower cover) that is to be attached to an upper portion (or a lower portion) of the main body case (see, for example, JP2009-273311A and JP2013-34320A).

For example, in the electrical junction box of related art, for the sake of waterproofness, both a peripheral wall of the main body case and a peripheral wall of the upper cover have a double-wall structure. In general, in the electrical junction box described above, when the main body case and the upper cover are attached to and detached from each other, the peripheral walls of the main body case and the upper cover both having a double-wall structure are fitted to each other, or detached from each other. However, in the electrical junction box described above, since the peripheral walls of the main body case and the upper cover have a double-wall structure, when the main body case and the upper cover are attached to and detached from each other, the peripheral walls of the main body case and the upper cover may interfere with each other if the main body case and the upper cover are attached to and detached from each other without the posture of each of the main body case and the upper cover being in parallel to an attaching direction in which the upper cover is attached to the main body case. Therefore, it is difficult to perform a step of attaching and detaching the main body case to and from the upper cover, and the workability is not good. As described above, the electrical junction box of related art is not excellent in workability while having waterproofness due to the double-wall structure of the main body case and the upper cover, and it is difficult to achieve both waterproofness and workability at the same time.

SUMMARY illustrative aspects of the present invention provide a resin structure having excellent workability while maintaining high waterproofness.

According to an illustrative aspect of the present invention, a resin structure includes a first resin body having a box shape with an opening portion and a second resin body configured to be attached to the first resin body so as to cover the opening portion. The first resin body includes a first wall portion having a double-wall structure and extending along an attaching direction in which the second resin body is attached to the first resin body, and a plurality of first engagement portions provided on the first wall portion. The second resin body includes a second wall portion having a double-wall structure configured to be fitted to the first wall portion and extending along the attaching direction, and a plurality of second engagement portions provided on the second wall portion and configured to be engaged with the plurality of first engagement portions. One of the plurality of first engagement portions engages with one of the plurality of second engagement portions and together form a first engaging part. Another one of the plurality of first engagement portions engages with another one of the plurality of second engagement portions and together form a second engaging part. The first engaging part and the second engaging part are positioned at two positions opposite to each other in a peripheral direction of the resin structure. The first engaging part is positioned on a further front side than the second engaging part in the attaching direction. The resin structure is configured such that, when the second resin body is rotated with respect to the first resin body with the first engaging part as a center of rotation and with the one of the plurality of first engagement portions being engaged with the one of the plurality of second engagement portions, the first wall portion is prevented from interfering with the second wall portion.

Other aspects and advantages of the invention will be apparent from the following description, the drawings and the claims.

DESCRIPTION OF EMBODIMENTS

Hereinafter, a resin structure 1 according to an embodiment of the present invention shown in FIGS. 1 and 2 will be described with reference to the drawings. The resin structure 1 is typically a relay box (i.e., an electrical junction box) that is to be mounted on a vehicle and to accommodate electronic components such as a relay.

Figure 1:
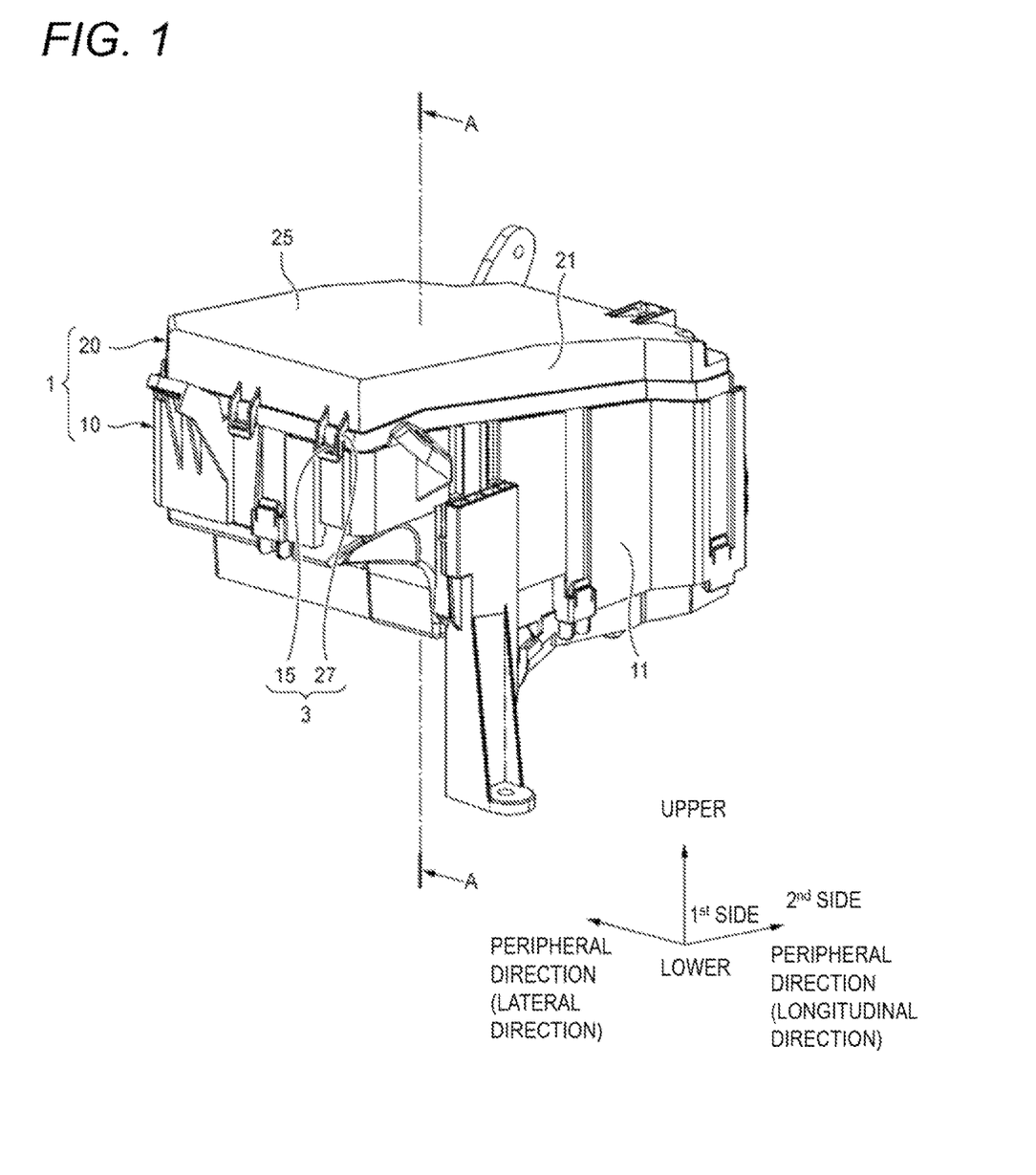
FIG. 1 is a perspective view of a resin structure according to an embodiment of the present invention as viewed from a first side (one side)
Figure 2:
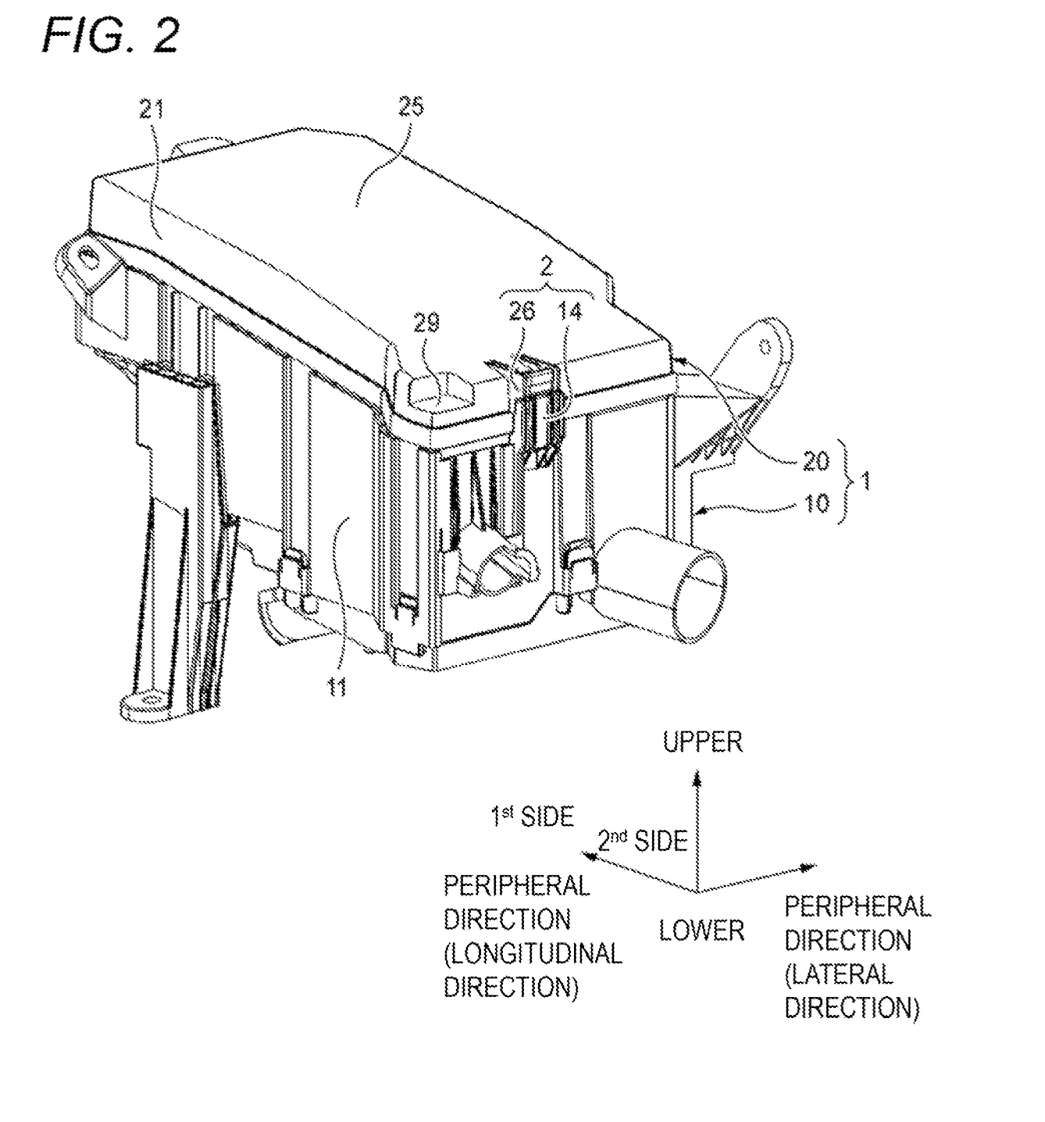
FIG. 2 is a perspective view of the resin structure shown in FIG. 1 as viewed from a second side (the other side)

Referring now to FIGS. 1 and 2, the resin structure 1 includes a main body case 10 and an upper cover 20. Electronic components (and other components, not shown) such as relays are to be accommodated in the main body case 10. The upper cover 20 is to be attached to an upper end portion of the main body case 10 so as to close an upper end opening portion of the main body case 10. The main body case 10 and the upper cover 20 together form the resin structure 1. The main body case 10 may be called a "first resin body", and the upper cover 20 may be called a "second resin body". In addition, an engagement portion including a first lock portion 14 and a second lock portion 26, which will be described later, is referred to as a lock portion 2, and another engagement portion including a first hook portion 15 and a second hook portion 27, which will be described later, is referred to as a hook portion 3. The lock portion 2 may also be called a "second engaging part", and the hook portion 3 may also be called a "first engaging part".

Hereinafter, for convenience of description, as shown in FIGS. 1 to 7, "upper-lower direction", "peripheral direction", "inner-outer direction", "upper", "lower", "inner", and "outer" are defined. The "upper-lower direction", the "peripheral direction", and the "inner-outer direction" are orthogonal to one another. The "upper-lower direction" corresponds to an attaching direction in which the upper cover 20 is attached to the main body case 10. The "peripheral direction" corresponds to a peripheral direction of a peripheral wall 11 (described later) of the main body case 10 and a peripheral wall 21 (described later) of the upper cover 20. The "inner-outer direction" corresponds to a thickness direction of the peripheral wall 11 and the peripheral wall 21 and the "inner-outer direction" may also correspond to a radial direction of the resin structure 1. Hereinafter, each member forming the resin structure 1 will be described.

First, the main body case 10 will be described. As shown in FIG. 2, the main body case 10 has a peripheral wall 11 having a substantially rectangular cylindrical shape and extending along the upper-lower direction. As shown in FIGS. 1 to 3B, an upper end portion of the peripheral wall 11 on a first side in a longitudinal direction of the main body case 10, the longitudinal direction being along the peripheral direction of the peripheral wall 11, is located above an upper end portion of the peripheral wall 11 on the other side, i.e., a second side in the longitudinal direction. The first side is a left side in FIGS. 3A and 3B, and the second side is a right side in FIGS. 3A and 3B.

As shown in FIGS. 4 to 6B, the peripheral wall 11 has a double-wall structure extending along the upper-lower direction, which includes a first inner wall 12 having a substantially rectangular cylindrical shape and located on an inner side in the inner-outer direction, and a first outer wall 13 having a substantially rectangular cylindrical shape and located on an outer side than the first inner wall 12 in the inner-outer direction by a predetermined distance over the entire peripheral direction. Therefore, between the first inner wall 12 and the first outer wall 13, there is provided an inter-wall space H (see FIGS. 5A and 5B) having a substantially rectangular cylindrical shape and extending along the upper-lower direction.

As shown in FIGS. 5A to 6B, the upper end portion (an upper end) of the first inner wall 12 is located on the upper side than the upper end portion of the first outer wall 13 on the first side, and is located on the lower side than the upper end portion of the first outer wall 13 on the second side and along the longitudinal direction of the main body case 10. In other words, in the first inner wall 12 and the first outer wall 13 that run along a lateral direction of the main body case 10, the lateral direction being along the peripheral direction and perpendicular to the longitudinal direction, the upper end portion of one of the first inner wall 12 and the first outer wall 13, which is closer to a center of rotation (that is, the hook portion 3, which will be described later) than the other one of the first inner wall 12 and the first outer wall 13, is located at a lower position than the upper end portion of the other one of the first inner wall 12 and the first outer wall 13 which is located farther from the center of rotation than the one of the first inner wall 12 and the first outer wall 13. A positional relationship between the upper end portion of the first inner wall 12 and the upper end portion of the first outer wall 13 in the upper-lower direction is switched at portions D1 and D2 (see FIGS. 6A and 6B).

As shown in FIGS. 1, 2, 6A and 6B, the first lock portion 14 is provided on the second side of the main body case 10, on an outer surface of the first outer wall 13 and in the vicinity of an upper end of the first outer wall 13. Further the first hook portion 15 (two, in the present example) is provided on the first side. That is, the first lock portion 14 is located below the first hook portion 15.

Figures 6A, 6B:
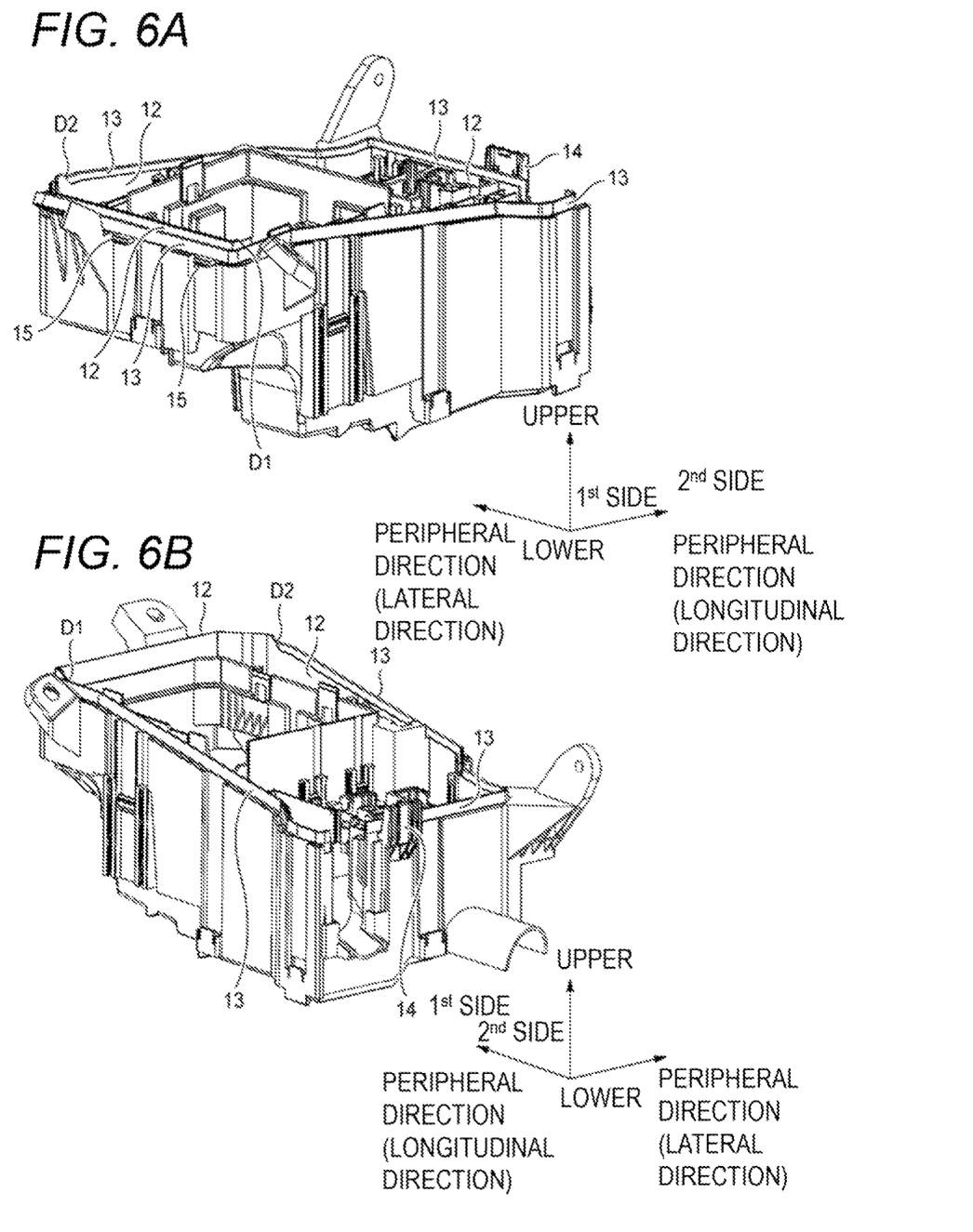
FIG. 6A is a perspective view of a main body case according to the embodiment of the present invention as viewed from the first side.
FIG. 6B is a perspective view of the main body case shown in FIG. 6A as viewed from the second side.

The first lock portion 14 extends upward from the upper end of the first outer wall 13, and is to be engaged with the second lock portion 26 of the upper cover 20, which will be described later. The first hook portion 15 protrudes from a portion of the first outer wall 13 in the vicinity of the upper end of the first outer wall 13 toward the outer side, and is to be engaged with the second hook portion 27 of the upper cover 20, which will be described later.

Figure 4:
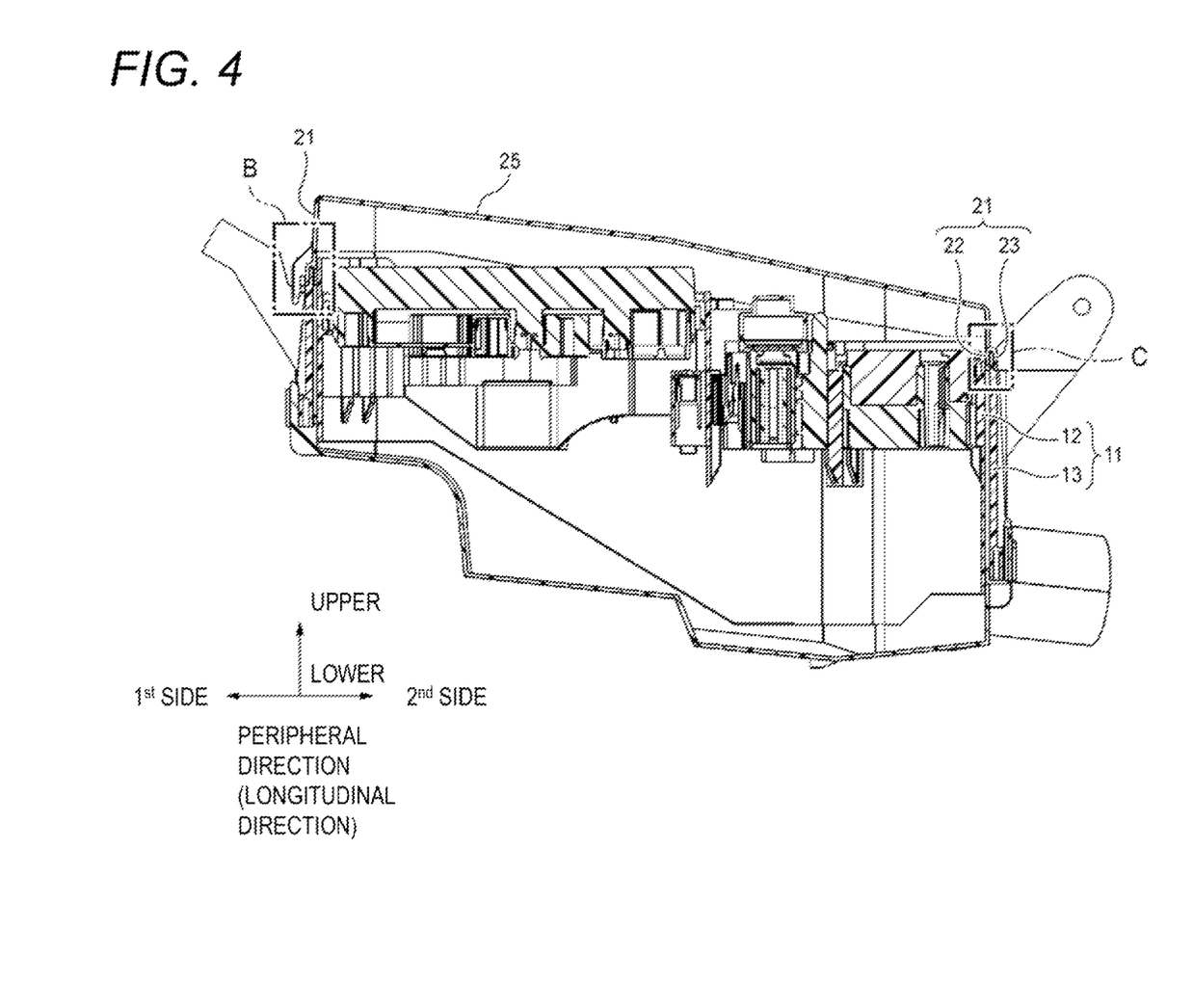
FIG. 4 is a cross-sectional view taken along a line A-A in FIG. 1.
Figure 5A:
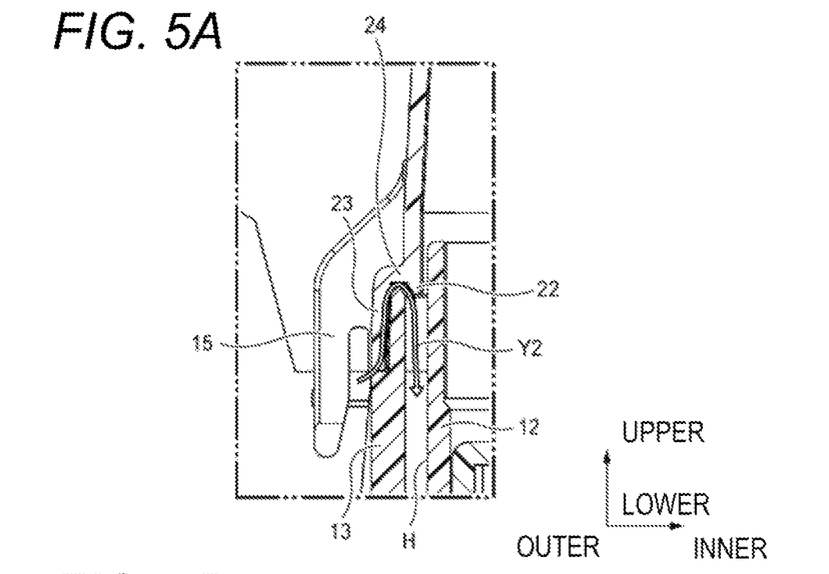
FIG. 5A is an enlarged view of a portion B shown in FIG. 4.
Figure 5B:
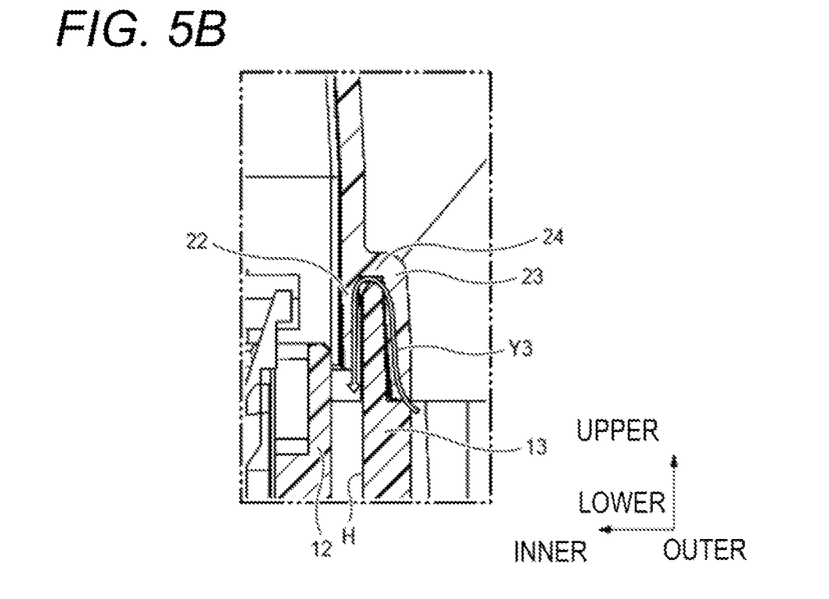
FIG. 5B is an enlarged view of a portion C shown in FIG. 4.

Next, the upper cover 20 will be described. As shown in FIG. 2, the upper cover 20 integrally includes the peripheral wall 21 having a substantially rectangular cylindrical shape and extending along the upper-lower direction and a upper wall 25 having a substantially rectangular flat plate-shape that closes an upper end opening portion of the peripheral wall 21. As shown in FIGS. 4 to 5B, the peripheral wall 21 includes a second inner wall 22 having a substantially rectangular cylindrical shape and located on the inner side in the inner-outer direction, and a second outer wall 23 having a substantially rectangular cylindrical shape and located on the outer side than the second inner wall 22 in the inner-outer direction by a predetermined distance over the entire region in the peripheral direction.

As shown in FIGS. 4 to 5B, a lower end portion of the second inner wall 22 is located above a lower end portion of the second outer wall 23. An upper end portion of the second inner wall 22 and an upper end of the second outer wall 23 are coupled by a coupling portion 24. That is, the peripheral wall 21 further includes the coupling portion 24 that couples the second inner wall 22 and the second outer wall 23 to each other over the entire region in the peripheral direction.

As described above, the peripheral wall 21 has a double-wall structure extending along the upper-lower direction that includes the second inner wall 22 and the second outer wall 23 provided at a lower end of the peripheral wall 21. A length in the upper-lower direction of the second inner wall 22 on the first side is shorter than that of the second inner wall 22 on the second side, and the lower end of the second inner wall 22 on the first side is located on an upper side than that of the second inner wall 22 on the second side.

As shown in FIGS. 1 and 2, on the outer surface of the second outer wall 23, the second lock portion 26 is provided on the second side as described above, and on the first side, the second hook portion 27 (in the present example, two) is provided in the vicinity of a lower end of the second outer wall 23. The second lock portion 26 is integrally provided with an operation portion 28 above a portion of the second lock portion 26 to be engaged with the first lock portion 14. The second hook portion 27 extends downward from the lower end of the first outer wall 13, and is formed in a frame shape which the first hook portion 15 formed in a protruding shape can be located inside and engaged with.

Figure 7:
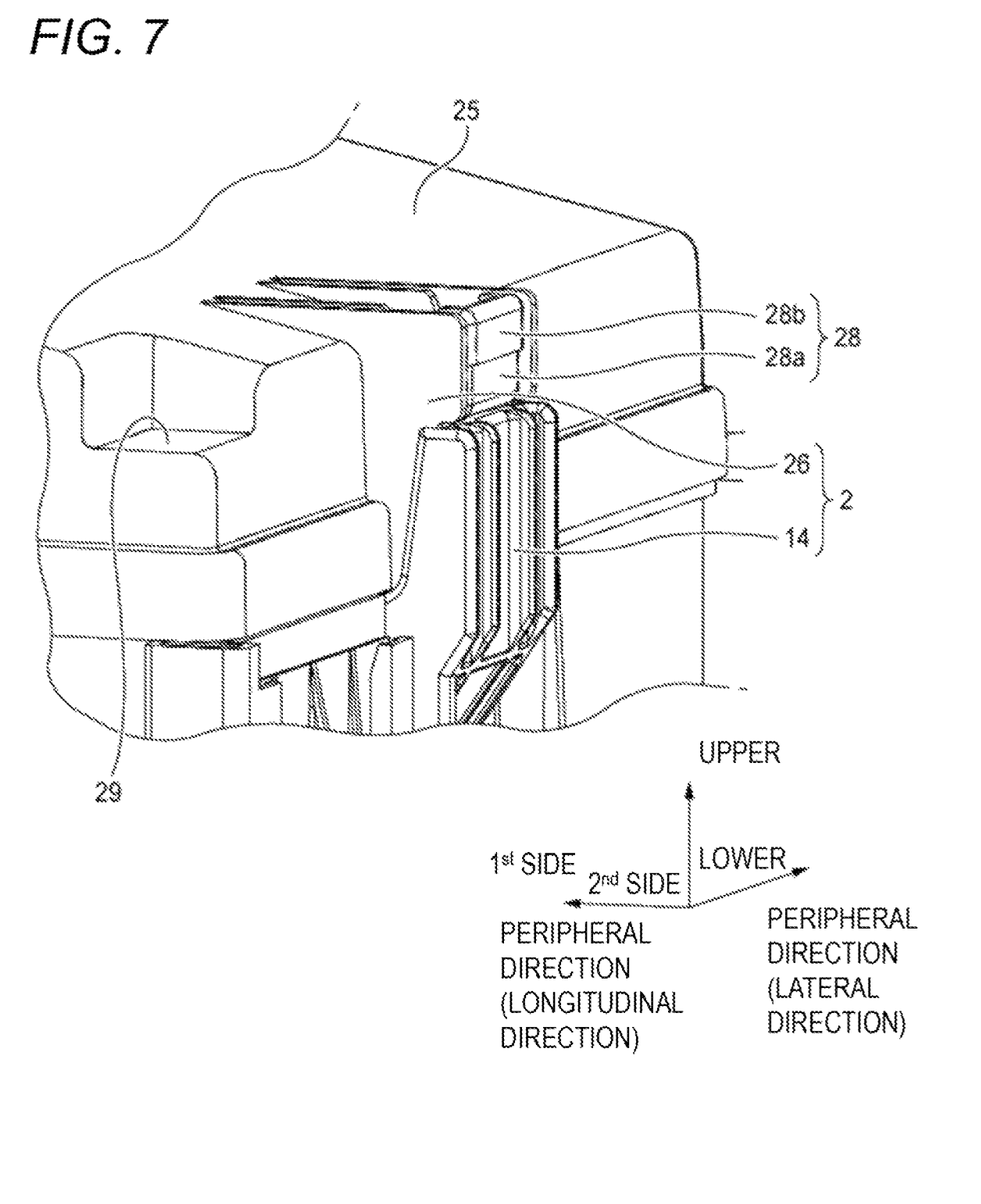
FIG. 7 is an enlarged perspective view of a lock portion and a recess portion shown in FIG. 2 as viewed from a different angle.

As shown in FIG. 7, the operation portion 28 includes a lower step portion 28*a* and an upper step portion 28*b* located above the lower step portion 28*a* and protruding toward the outer side than the lower step portion 28*a*. The operation portion 28 has a stepped shape formed by stacking the lower step portion 28a and the upper step portion 28b along the upper-lower direction.

As shown in FIGS. 2 and 7, the upper wall 25 has a recess portion 29 recessed downward at one portion of two corner portions of the upper wall 25 on the second side. The recess portion 29 may be provided at each of two corner portions on the second side.

Next, an attached state of the main body case 10 and the upper cover 20 will be described. In the attached state, as shown in FIGS. 4, 5A and 5B, the peripheral wall 11 having the double-wall structure of the main body case 10 and the peripheral wall 21 having the double-wall structure of the upper cover 20 are fitted to each other. Specifically, the second inner wall 22 of the upper cover 20 is located in the inter-wall space H, and the upper end portion of the first outer wall 13 of the main body case 10 is in contact with the coupling portion 24. At this time, the first lock portion 14 and the second lock portion 26 are engaged with each other, and the first hook portion 15 and the second hook portion 27 are engaged with each other.

As described above, since the peripheral wall 11 and the peripheral wall 21 which have the double-wall structure are fitted to each other, it is difficult for water to enter the resin structure from the outside to the inside. Even when the water enters the inside of the resin structure 1, the entering water flows along an arrow Y2 on the first side (see FIG. 5A) and is discharged to the outside from a lower side in the inter-wall space H, and flows along an arrow Y3 on the second side (see FIG. 5B) and is discharged to the outside from the lower side in the inter-wall space H. As described above, the resin structure 1 according to the present embodiment has high waterproofness because the peripheral wall 11 and the peripheral wall 21 are fitted to each other (i.e., the resin structure 1 has a so-called labyrinth structure).

Next, a step of removing the upper cover 20 from the main body case 10 will be described. First, an operator puts one finger on the operation portion 28 and places another finger on the recess portion 29 provided in the upper wall 25 of the upper cover 20. At this time, for example, the operator extends his/her arm from the first side toward the second side above the upper wall 25, puts his/her index finger or middle finger on the operation portion 28, and places his/her ring finger or little finger on the recess portion 29. Then, by operating the operation portion 28, the engagement of the lock portion 2 is released.

Figure 3A:
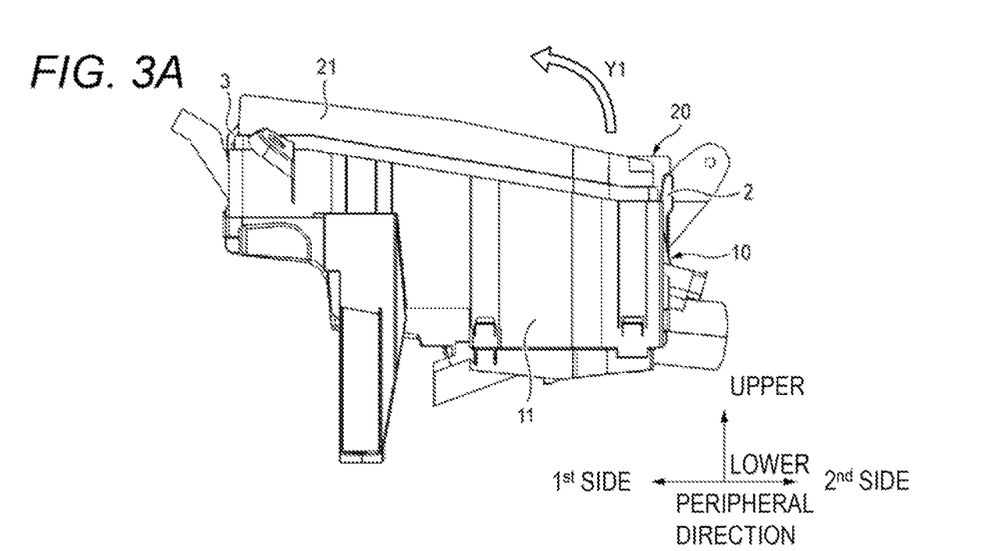
FIGS. 3A and 3B are side views of the resin structure shown in FIG. 1.
Figure 3B:
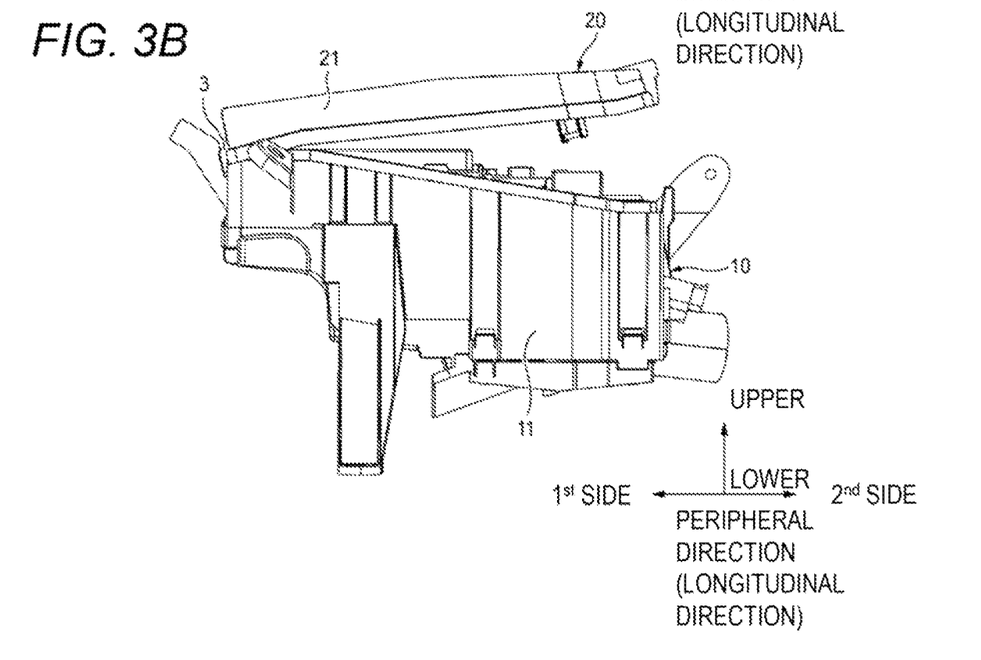

Thereafter, as shown in FIG. 3A, the operator lifts the upper cover 20 at the second side upward with the hook portion as the center of rotation and rotates the upper cover 20 in a direction of an arrow Y1.

At this time, since the hook portion 3 is located above the lock portion 2, a radius of rotation is larger than that in a case where the hook portion 3 and the lock portion 2 are located at the same height in the upper-lower direction. Therefore, the upper cover 20 has a gentler rotation trajectory (that is, rotation) as compared with the case where the upper cover 20 is located at the same height as described above. That is, the peripheral wall 21 is moved substantially parallel to the peripheral wall 11 (that is, along the upper-lower direction). Therefore, the peripheral wall 11 and the peripheral wall 21 do not easily interfere with each other.

Finally, the operator removes the release of the hook portion. Thus, the upper cover is removed from the main body case 10. As described above, the resin structure 1 can be released from the attached state of the main body case 10 and the upper cover 20 by rotating the upper cover 20.

In particular, in the removing step described above, the operation portion 28 has a stepped shape formed by the lower step portion 28a and the upper step portion 28b, and thus the finger of the operator is prevented from slipping from the operation portion 28. Further, since the upper wall 25 is provided with the recess portion 29, the operator can place a finger different from the finger put on the operation portion 28 on the recess portion 29, and can remove the upper cover 20 from the main body case 10 with one hand. That is, as described above, the operator can easily perform the removing step.

Although the removing step has been described in the present example, the upper cover 20 can be easily attached to the main body case 10 by engaging the hook portion 3 and rotating the upper cover 20 in the direction opposite to the arrow Y1. In the attaching step, since the hook portion 3 is located above the lock portion 2, the peripheral wall 21 is easily fitted to the peripheral wall 11 from above in the upper-lower direction. As described above, in the resin structure 1 according to the present embodiment, the main body case 10 and the upper cover 20 can be easily attached to and detached from each other, and workability is excellent.

According to the resin structure 1 of the present embodiment, since the peripheral wall 11 and the peripheral wall 21 have a double-wall structure and are fitted to each other (since the resin structure 1 has a so-called labyrinth structure), the resin structure 1 is excellent in waterproofness in the attached state. In the resin structure 1 according to the present embodiment, the upper cover 20 is rotated with the hook portion 3 as the center of rotation in a state where the hook portion 3 is located above the lock portion 2 and the first hook portion 15 and the second hook portion 27 are engaged with each other. As a result, when the upper cover 20 is rotated, the peripheral wall 21 is moved substantially in parallel with the peripheral wall 11 in the upper-lower direction as compared with a case where the hook portion 3 is not located above the lock portion 2. That is, in the middle of rotation of the upper cover 20, interference between the peripheral wall 11 and the peripheral wall 21 is avoided. In addition, without moving the main body case 10 and the upper cover 20 parallel to each other along the upper-lower direction as in related art, the resin structure 1 can be easily assembled and disassembled by supporting the resin structure 1 at one point and rotating the upper cover 20. As a result, the resin structure 1 according to the present embodiment is excellent in workability while maintaining high waterproofness.

Further, on the first side, comparing the first inner wall 12 and the first outer wall 13, the upper end portion of the first inner wall 12, which is located farther from the center of rotation (that is, the hook portion 3) than the first outer wall 13, is located on the upper side than that of the first outer wall 13, and on the second side, the upper end portion of the first outer wall 13, which is located farther from the center of rotation than the first inner wall 12, is located on the upper side than that of the first inner wall 12. Therefore, one of the first inner wall 12 or the first outer wall 13 (that is, the peripheral wall 11) running along the lateral direction, the one being closer to the center of rotation, is prevented from interfering with the peripheral wall 21 in the middle of the rotation of the upper cover 20. As a result, the resin structure 1 according to the present embodiment is excellent in workability while maintaining high waterproofness.

Further, the second inner wall 22 is accommodated in the inter-wall space H defined between the first inner wall 12 and the first outer wall 13, so that the peripheral wall 11 and the peripheral wall 21 are fitted to each other. A length of the second inner wall 22 in the upper-lower direction on the first side is shorter than a length of the second inner wall 22 in the upper-lower direction on the second side and running along the longitudinal direction. On the first side, which is closer to the center of rotation than the second side, the second inner wall 22 easily interferes with the peripheral wall 11 in the middle of the rotation, in general. However, since the length of the second inner wall 22 accommodated in the inter-wall space H on the first side is shorter than the length on the second side, interference between the second inner wall 22 and the peripheral wall 11 on the first side is particularly avoided. As a result, the resin structure 1 according to the present embodiment is excellent in workability while maintaining high waterproofness.

Further, since the operation portion 28 is provided integrally with the second lock portion 26, a finger can be hooked on the upper step portion 28*b* when the upper cover 20 is rotated at the time of attaching and detaching the main body case 10 to and from the upper cover 20. In addition, since the recess portion 29 is provided on the upper wall 25, a finger different from the finger put on the upper step portion 28*b* can be placed on the recess portion 29. Therefore, the resin structure 1 according to the present embodiment is excellent in workability because the upper cover 20 can be rotated with one hand. While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a resin structure (1) includes a first resin body (for example, a main body case 10) having a box shape with an opening portion and a second resin body (for example, an upper cover 20) configured to be attached to the first resin body so as to cover the opening portion. The first resin body (for example, the main body case 10) includes a first wall portion (for example, a peripheral wall 11) having a double-wall structure and extending along an attaching direction in which the second resin body is attached to the first resin body, and a plurality of first engagement portions (for example, a first lock portion 14, a first hook portion 15) provided on the first wall portion. The second resin body (for example, the upper cover 20) includes a second wall portion (for example, a peripheral wall 21) having a double-wall structure configured to be fitted to the first wall portion and extending along the attaching direction, and a plurality of second engagement portions (for example, a second lock portion 26, a second hook portion 27) provided on the second wall portion and configured to be engaged with the plurality of first engagement portions. One (for example, the first hook portion 15) of the plurality of first engagement portions engages with one (for example, the second hook portion 27) of the plurality of second engagement portions and together form a first engaging part (for example, a hook portion 3). Another one (for example, the first lock portion 14) of the plurality of first engagement portions engages with another one (for example, the second lock portion 26) of the plurality of second engagement portions and together form a second engaging part (for example, a lock portion 2). The first engaging part (for example, the hook portion 3) and the second engaging part (for example, the lock portion 2) are positioned at two positions opposite to each other in a peripheral direction of the resin structure (1). The first engaging part (for example, the hook portion 3) is positioned on a further front side than the second engaging part (for example, the lock portion 2) in the attaching direction. The resin structure (1) is configured such that, when the second resin body (for example, the upper cover 20) is rotated with respect to the first resin body (for example, the main body case 10) with the first engaging part (for example, the hook portion 3) as a center of rotation and with the one (for example, the first hook portion 15) of the plurality of first engagement portions being engaged with the one (for example, the second hook portion 27) of the plurality of second engagement portions, the first wall portion (for example, the peripheral wall 11) is prevented from interfering with the second wall portion (for example, the peripheral wall 21).

According to the resin structure having the above configuration, both the first wall portion of the first resin body and the second wall portion of the second resin body have a double-wall structure, and the first wall portion and the second wall portion are fitted to each other. Specifically, one of the first resin body and the second resin body has a space between two walls forming the double-wall structure, and the wall of the other one of the first resin body and the second resin body is inserted into this space, so that the first resin body and the second resin body are fitted together. Therefore, the resin structure having the present configuration has excellent waterproofness. In addition, in the resin structure having the present configuration, the second resin body is rotated with the first engaging part as the center of rotation in a state where the first engaging part is located on the further front side in the attaching direction than the second engaging part, which is located on an opposite side to the first engaging part in the peripheral direction of the resin structure, and in a state where one of the first engagement portions and one of the second engagement portions are engaged with each other at the first engaging part. Accordingly, when the second resin body is rotated with respect to the first resin body, the second wall portion is moved substantially parallel to the attaching direction with respect to the first wall portion as compared with a case where the first engaging part is not located on the further front side in the attaching direction than the second engaging part. That is, since the first engaging part, as the center of rotation, is located on the further front side in the attaching direction than the second engaging part, interference between the first wall portion and the second wall portion is avoided in the middle of rotation of the second resin body. In addition, without moving the first resin body and the second resin body parallel to the attaching direction as in related art, the assembling and disassembling work of the resin structure is facilitated by supporting one point of the resin structure and rotating the second resin body. As a result, the resin structure having the present configuration is excellent in workability while maintaining high waterproofness.

The first wall portion (for example, the peripheral wall 11) may include the double-wall structure including a first inner wall (12) and a first outer wall (13) located on an outer side in a radial direction of the resin structure (1) than the first inner wall (12). On a first side of the resin structure (1) at which the first engaging part (for example, at the hook portion 3) is provided, an upper end of the first inner wall (12) may be located on the further front side in the attaching direction than an upper end of the first outer wall (13) (as shown in FIG. 5A, for example), and, on a second side of the resin structure (1) at which the second engaging part (for example, at the lock portion 2) is provided, the upper end of the first outer wall (13) may be located on the further front side in the attaching direction than the upper end of the first inner wall (12)(as shown in FIG. 5B, for example).

With this configuration, at the first side at which the first engaging part is provided, the end portion (the upper end) of the first inner wall is located on the further front side in the attaching direction than the end portion of the first outer wall, and at the second side at which the second engaging part is provided, the end portion of the first outer wall is located on the further front side than the end portion of the first inner wall. In other words, on the first side, comparing the first inner wall and the first outer wall, the end portion of the first inner wall, which is farther from the center of rotation than the first outer wall, is located on the further front side in the attaching direction than that of the first outer wall. On the second side, comparing the first inner wall and the first outer wall, the end portion of the first outer wall, which is farther from the center of rotation than the first inner wall, is located on the front side in the attaching direction than that of the first inner wall. Therefore, one of the first inner wall and the first outer wall closer to the center of rotation than the other one of the first inner wall and the first outer wall is prevented from interfering with the second wall portion in the middle of the rotation. As a result, the resin structure having the present configuration is excellent in workability while maintaining high waterproofness.

The second wall portion (for example, the peripheral wall 21) may include the double-wall structure including a second inner wall (22) and a second outer wall (23) located on the outer side in the radial direction of the resin structure (1) than the second inner wall (22). The second inner wall (22) may be configured to be accommodated in an inter-wall space (H) defined between the first inner wall (12) and the first outer wall (13). A length in the attaching direction of the second inner wall (22) on the first side may be shorter than a length in the attaching direction of the second inner wall (22) on the second side (as shown in FIGS. 5A and 5B).

With this configuration, the first wall portion and the second wall portion are fitted to each other by the second inner wall being accommodated in the inter-wall space defined between the first inner wall and the first outer wall. The length of the second inner wall on the first side in the attaching direction is shorter than the length of the second inner wall on the second side in the attaching direction. On the first side closer to the center of rotation than the second side, the second inner wall is likely to interfere with the first wall portion in the middle of the rotation. However, the length of the second inner wall accommodated in the inter-wall space on the first side, which is closer to the center of rotation than the second inner wall on the second side, is shorter than the length of the second inner wall on the second side, so that interference between the second inner wall and the first wall portion on the first side is avoided. As a result, the resin structure having the present configuration is excellent in workability while maintaining high waterproofness.

The second resin body (for example, the upper cover 20) may further include a protrusion portion (for example, an upper step portion 28b) protruding toward the outer side in the radial direction of the resin structure (1) and provided on the further front side than the another one (for example, the second lock portion 26) of the plurality of second engagement portions in the attaching direction and a third wall portion (for example, an upper wall 25) configured to, when the second resin body (for example, the upper cover 20) is attached to the first resin body (for example, the main body case 10), cover the opening portion of the first resin body.

The third wall portion (for example, the upper wall 25) may include a recess portion (29) recessed toward a back side in the attaching direction, the back side being opposite to the front side, and provided on the second side.

With this configuration, the protrusion portion protruding to the outer side of the resin structure is provided on the further front side than the second engagement portion belonging to the second engaging part. At the time of attaching and detaching the first resin body and the second resin body, when the second resin body is rotated, by virtue of the protrusion portion provided in the vicinity of the second engagement portion belonging to the second engaging part, the operator can put a finger on the protrusion portion. In addition, since the recess portion is provided on the second side of the third wall portion that covers the opening portion, the operator can place a finger different from the finger put on the protrusion portion on the recess portion. Therefore, the second resin body can be rotated with one hand, and the first resin body and the second resin body can be easily attached and detached. As a result, the resin structure having the present configuration is excellent in workability.

What is claimed is:

1. A resin structure comprising:

a first resin body having a box shape with an opening portion; and a second resin body configured to be attached to the first resin body at an upper side thereof so as to cover the opening portion, wherein the first resin body includes a first wall portion having a double-wall structure and extending along an attaching direction in which the second resin body is attached to the first resin body, and a plurality of first engagement portions provided on the first wall portion;

wherein the second resin body includes a second wall portion having a double-wall structure configured to be fitted to the first wall portion and extending along the attaching direction, and a plurality of second engagement portions provided on the second wall portion and configured to be engaged with the plurality of first engagement portions;

wherein one of the plurality of first engagement portions engages with one of the plurality of second engagement portions and together form a first engaging part;

wherein another one of the plurality of first engagement portions engages with another one of the plurality of second engagement portions and together form a second engaging part;

wherein the first engaging part and the second engaging part are positioned at two positions opposite to each other in a peripheral direction of the resin structure;

wherein the first engaging part is positioned above the second engaging part in the attaching direction; and wherein the resin structure is configured such that, when the second resin body is rotated with respect to the first resin body with the first engaging part as a center of rotation and with the one of the plurality of first engagement portions being engaged with the one of the plurality of second engagement portions, the first wall portion is prevented from interfering with the second wall portion.

2. The resin structure according to claim 1,
wherein the first wall portion includes the double-wall structure including a first inner wall and a first outer wall located on an outer side in a radial direction of the resin structure than the first inner wall, and
wherein, on a first side of the resin structure at which the first engaging part is provided, an upper end of the first inner wall is located above an upper end of the first outer wall, and, on a second side of the resin structure at which the second engaging part is provided, the upper end of the first outer wall is located above the upper end of the first inner wall.

3. The resin structure according to claim 2,
wherein the second wall portion includes the double-wall structure including a second inner wall and a second outer wall located on the outer side in the radial direction of the resin structure than the second inner wall,
wherein the second inner wall is configured to be accommodated in an inter-wall space defined between the first inner wall and the first outer wall, and
wherein a length in the attaching direction of the second inner wall on the first side is shorter than a length in the attaching direction of the second inner wall on the second side.

4. The resin structure according to claim 1,
wherein the second resin body further includes: a protrusion portion protruding toward an outer side in a radial direction of the resin structure and provided on the further front side than the another one of the plurality of second engagement portions in the attaching direction; and a third wall portion configured to, when the second resin body is attached to the first resin body, cover the opening portion of the first resin body, and
wherein the third wall portion includes a recess portion recessed toward a back side in the attaching direction, the back side being opposite to the front side, and provided on a second side of the resin structure at which the second engaging part is provided.

* * * * *